: 3,786,064
Patented Jan. 15, 1974

3,786,064
BENZOXAZOLE COMPOUNDS USEFUL AS
OPTICAL BRIGHTENING AGENTS
Horst Harnisch, Cologne, Germany, assignor to Bayer
Aktiengesellschaft, Leverkusen, Germany
No Drawing. Filed Apr. 1, 1970, Ser. No. 24,860
Claims priority, application Germany, Apr. 5, 1969,
P 19 17 601.3; Oct. 25, 1969, P 19 53 809.1
Int. Cl. C07d 85/48
U.S. Cl. 260—307 D         8 Claims

ABSTRACT OF THE DISCLOSURE

Benzoxazole compounds of the general formula

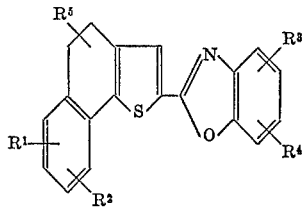

in which $R^1$ and $R^2$ stand for hydrogen, halogen, alkyl groups, or together stand for the residual members of a cycloaliphatic ring; $R^3$ denotes hydrogen, halogen, an alkyl, cycloalkyl, aralkyl, aryl, carboxylic acid ester, carboxylic acid amide, alkylsulphonyl, arylsulphonyl radical, or an aminosulphonyl radical; $R^4$ stands for hydrogen or an alkyl radical; $R^3$ and $R^4$ together may also be the residual members of a cycloaliphatic ring; and $R^5$ denotes an alkyl radical or hydrogen, as well as their preparation and their use as optical brightening agents.

---

The subject-matter of the present invention comprises valuable, new, fluorescent, virtually colorless benzoxazole compounds of the general formula

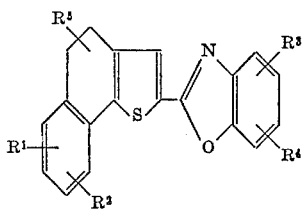

in which $R^1$ and $R^2$ are identical or different and stand for hydrogen, halogen, alkyl groups, or together stand for the residual members of a cycloaliphatic 5- or 6-membered ring; $R^3$ denotes hydrogen, halogen, an alkyl, cycloalkyl, aralkyl, aryl, carboxylic acid ester, carboxylic acid amide, alkylsulphonyl, arylsulphonyl radical or an amino-sulphonyl radical preferably substituted by alkyl radicals; $R^4$ stands for hydrogen or an alkyl radical; $R^3$ and $R^4$ together may also be the residual members of a cycloaliphatic 5- or 6-membered ring; and $R^5$ denotes an alkyl radical or hydrogen, as well as their production and their use as optical brightening agents.

The compounds of the Formula I are suitable for the brightening of natural fibres or fabrics such as wool or cellulose, but particularly for the brightening of fibre materials, foils and masses of synthetic origin, for example, those made of polyvinyl compounds, such as polyvinyl chloride or polyvinyl acetate, polystyrene, polyolefines, such as polyethylene or polypropylene, polymers containing acrylonitrile, and of those made of cellulose esters, polyamides, polyurethanes and aromatic polyesters.

The new benzoxazole compounds of the Formula I are prepared, for example, by condensing carboxylic acids of the formula

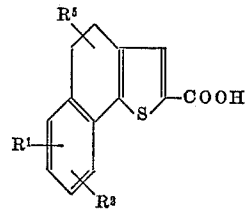

in which $R^1$, $R^2$ and $R^5$ have the same meaning as above, or their functional derivatives, with aminophenols of the formula

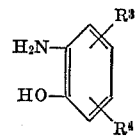

in which $R^3$ and $R^4$ have the same meaning as above, expediently in the presence of an acidic catalyst, such as boric acid, p-toluene-sulphonic acid or zinc chloride, in the melt or optionally in an inert, high-boiling, organic solvent, such as dichlorobenzene, trichlorobenzene, xylene, p-cymol, dimethyl formamide, propylene glycol, diethylene glycol diethyl ether or triethylene glycol diethyl ether, at temperatures of about 160 to 300° C.

In some cases, especially if $R^3$ is a metadirecting substituent, such as e.g. a dialkylamino-sulphonyl radical, it is advisable first to prepare from the carboxylic acid of the Formula II and the aminophenyl of the Formula III, at 140 to 200° C., the amide of the formula

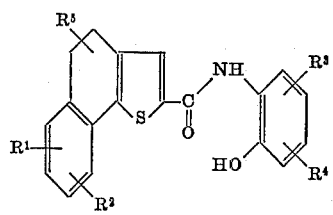

in which $R^1$ to $R^5$ have the same meaning as above, and then to convert the latter, with or without intermediate isolation, with the aid of a dehydrating agent, such as phosphorus oxychloride (90–100° C.), polyphosphoric acid (150–170° C.) or boric acid (240–300° C.), into the benzoxazole compounds of the Formula I.

Suitable carboxylic acids of the Formula II are, for example, the compounds of the Formula V listed in the following table:

Compounds of the formula

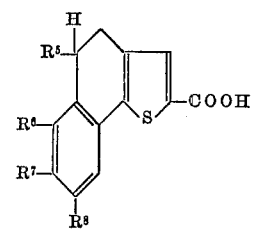

TABLE

| R⁵ | R⁶ | R⁷ | R⁸ |
|---|---|---|---|
| CH₃ | H | H | H |
| C₂H₅ | H | H | H |
| H | H | CH₃ | H |
| H | H | H | CH₃ |
| H | H | H | C₂H₅ |
| H | H | H | (CH₃)₂CH |
| H | CH₃ | H | CH₃ |
| H | H | CH₃ | CH₃ |
| H | Cl | H | H |
| H | H | Cl | H |
| H | H | H | Cl |
| H | Cl | H | Cl |
| H | H | F | H |
| H | Br | H | H |

Other suitable compounds of the Formula II are, for example

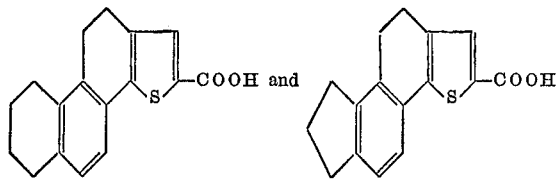

The carboxylic acids of the Formula II can be obtained, for example, by hydrolysis of their ethyl esters which can be prepared by the method described in Tetrahedron Letters 1968, 1317, from α-tetralone derivatives via the stage of the corresponding chloraldehydes.

Examples of suitable aminophenols of the Formula III are:

1-amino-2-hydroxy-benzene
1-amino-2-hydroxy-4-methylbenzene
1-amino-2-hydroxy-5-methylbenzene
1-amino-2-hydroxy-3,5-dimethylbenzene
1-amino-2-hydroxy-4,5-dimethylbenzene
1-amino-2-hydroxy-5-tert.-butylbenzene
1-amino-2-hydroxy-5-(1',1',3',3'-tetramethyl)-butylbenzene
1-amino-2-hydroxy-5-(β-cyanoethyl)-benzene
1-amino-2-hydroxy-(β-methoxycarbonylethyl)-benzene
1-amino-2-hydroxy-5-cyclohexylbenzene
1-amino-2-hydroxy-5-chlorobenzene
1-amino-2-hydroxy-5-fluorobenzene
1-amino-2-hydroxy-benzene-5-carboxylic acid methyl ester
1-amino-2-hydroxy-benzene-5-carboxylic acid methyl ester
1-amino-2-hydroxy-benzene-5-carboxylic acid isobutyl ester
1-amino-2-hydroxy-benzene-5-carboxylic acid benzyl ester
1-amino-2-hydroxy-benzene-5-carboxylic acid allyl ester
1-amino-2-hydroxy-benzene-5-carboxylic acid diethylamide
1-amino-2-hydroxy-benzene-5-carboxylic dimethylamide
1-amino-2-hydroxy-benzene-5-carboxylic acid morpholide
1-amino-2-hydroxy-benzene-5-carboxylic acid dimethyl hydrazide 5-amino-6-hydroxy-indane
1-amino-2-hydroxy-5-benzyl-benzene
1-amino-2-hydroxy-5-(phenylisopropyl)-benzene
1-amino-2-hydroxy-5-phenyl-benzene
1-amino-2-hydroxy-5-phenylsulphonyl-benzene
1-amino-2-hydroxy-5-methylsulphonyl-benzene
1-amino-2-hydroxy-5-ethylsulphonyl-benzene
1-amino-2-hydroxy-5-aminosulphonyl-benzene
1-amino-2-hydroxy-5-dimethylamino-sulphonyl-benzene
1-amino-2-hydroxy-5-diethylamino-sulphonyl-benzene
1-amino-2-hydroxy-di-n-butylamino-sulphonyl-benzene
1-amino-2-hydroxy-(piperidyl-N-sulphonyl)-benzene A particularly valuable group of benzoxazole compounds within the scope of the General Formula I corresponds to the formula

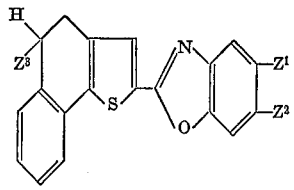

(VI)

in which $Z^1$ denotes hydrogen, halogen, an alkyl, cycloalkyl, aralkyl, aryl, carboxylic acid ester, alkylsulphonyl or dialkylamino-sulphonyl radical;
$Z^2$ stands for hydrogen or a lower alkyl radical; and
$Z^3$ denotes a methyl group or hydrogen.

The compounds of the Formula I can be used as optical brighteners in the usual way, for example in the form of aqueous dispersions, suitable dispersing agents being, inter alia, oleyl polyglycol ethers or condensation products of naphthalene-sulphonic acids and formaldehyde.

The brightening agents can also be applied with advantage from organic solutions, for example, those in which water-immiscible solvents, such as tetrachloroethylene, trichloroethylene, 1,1,1-trichloroethane or 1,1,1-trichloropropane are used. In these solvents, even the simplest representatives of the compounds according to the invention, without the aid of established solubilizing substituents such as tertiary butyl groups, have a good solubility in the cold, as is required for the preparation of clear padding liquors for the continuous dyeing of synthetic fibre materials.

The brightening agents can also be used together with detergents. Furthermore, they can be added to spinning and casting masses serving for the production of synthetic fibres, filaments, foils and other moulded articles.

The compounds of the present invention are very productive brightening agents and have an excellent range of application, on account of their good solubility; they are moreover fast to light and also fast to chlorite-containing bleaching baths. The benzoxazole compounds hitherto proposed as brightening agents do not have these advantageous properties to the same extent.

The parts given in the following examples are parts by weight; the temperatures are given as degrees centigrade.

EXAMPLE 1

23 parts 4,5 - dihydronaphtho - [1,2-b] - thiophen-2-carboxylic acid of melting point 208–211°, prepared by hydrolyzing the ethyl ester described in Tetrahedron Letters 1968, 1317, for 3 hours with a 3% sodium hydroxide solution and subsequent acidification, are heated with 15 parts 1-amino-2-hydroxy-5-methylbenzene and 1 part boric acid in 60 parts diethylene glycol diethyl ether under a weak nitrogen current at 185–190° for 1 hour while stirring, and subsequently heated at 190–230° for 30 minutes and at 230° for a further 30 minutes, the liquid being distilled off at the same time. The hot melt is then mixed at 170° while stirring with 30 parts dimethyl formamide and at 90° with 300 parts methanol, and stirred on an ice bath until cold. The resultant crystalline precipitate is filtered off with suction, washed with methanol, and dried in a vacuum at 50°. 24.1 parts of the compound of the formula (1)

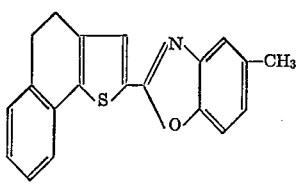

and of melting point 112–115° are obtained. After recrystallization from toluene (clarification with tonsil and active charcoal), the compound has a melting point of 115–117° (slight greenish yellow needles).

The following compounds are prepared in an analogous way with the use of the corresponding starting compounds:

(2)
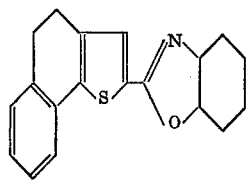

melting point: 143–145°

(3)
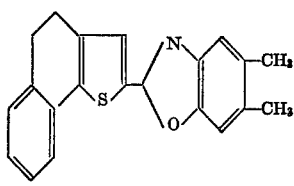

melting point: 175–177°

(4)
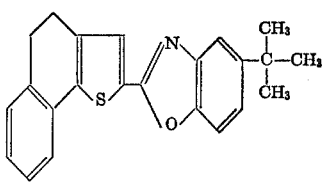

melting point: 115–117°

(5)
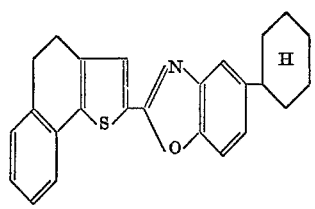

melting point: 167–169°

(6)
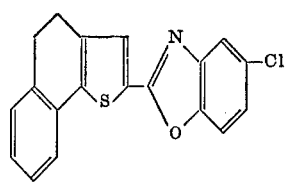

melting point 152–154°

EXAMPLE 2

24.4 parts 5-methyl-4,5-dihydronaphtho - [1,2-b] - thiophen-2-carboxylic acid of melting point 195–197°, prepared by hydrolyzing the ethyl ester prepared in analogy with Tetrahedron Letters 1968, 1317, for 2 hours with a 5% sodium hydroxide solution and subsequent acidification, are heated with 12 parts 1-amino-2-hydroxybenzene and 2 parts boric acid in 40 parts diethylene glycol diethyl ether under a weak nitrogen current, while stirring and distilling off the liquid, at 180–190° for 45 minutes, at 190–210° for 15 minutes, and at 230–240° for 30 minutes. The hot melt is mixed with 150 parts by volume ethanol, starting at 120° and cooling under reflux, and stirred on an ice bath until cold. The resultant crystalline precipitate is filtered off with suction, washed with ethanol, and dried in a vacuum at 50°. 16.5 parts of the compound of the formula (7)
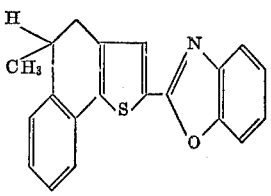

and of melting point 126–130° are obtained. After recrystallization from toluene (clarification with tonsil), the compound has a melting point of 131–132° (slightly greenish yellow needles).

EXAMPLE 3

23 parts 4,5-dihydronaphtho - [1,2 - b] - thiophen-2-carboxylic acid, 25 parts 1-amino-2-hydroxy - 5 - (phenylisopropyl)-benzene and 2 parts boric acid are heated under a weak nitrogen current, while stirring and distilling off the liquid, at 200° C. for 30 minutes, and then at 250° for 30 minutes. The melt is mixed at 200° with 30 parts dimethyl formamide and at 90° under reflux with 70 parts methanol, and stirred on an ice-bath until cold. The resultant crystalline precipitate is filtered off with suction, washed with alcohol, and dried in a vacuum at 60°. 24 parts of the compounds of the formula (8)
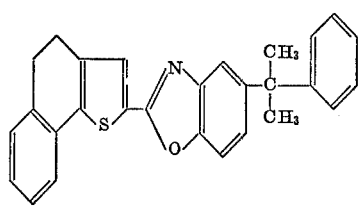

and of melting point 133–135° are obtained. For purification, the substance is dissolved in 50 parts benzene, the solution clarified with 1 part tonsil, filtered, and the product precipitated with petroleum ether. Yield 17.2 parts of melting point 139–140.5°.

The compound of the Formula 9 is prepared in an analogous way with the use of the corresponding starting compounds:

(9)
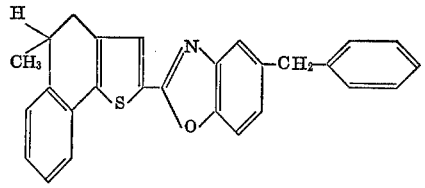

melting point: 104–106°

EXAMPLE 4

4.5 parts 5-methyl-4,5-dihydronaphtho - [1,2-b] - thiophen-2-carboxylic acid of melting point 195–197°, 6 parts 1-amino-2-hydroxy-5-phenyl-benzene and 0.5 part boric acid are heated in 10 parts diethylene glycol diethyl ether under a weak nitrogen current, while stirring and distilling off the liquid, at 180–190° for 45 minutes, at 190–210° for 30 minutes, and at 310–320° for 15 minutes. The hot melt is mixed with 10 parts dimethyl formamide, starting at 170°, and with 70 parts ethanol, starting at 90° and cooling under reflux, and then stirred on an ice bath until cold. The resultant crystalline precipitate is filtered off with suction, washed with ethanol, and dried in a vacuum at 50°.

There are obtained 5.6 parts of the compound of the formula

(10)
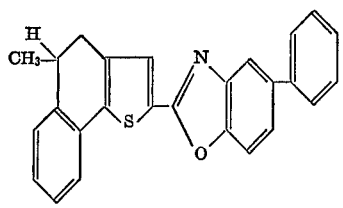

which is purified by dissolving it in hot benzene, clarification with tonsil, cooling, separating 0.7 part of an impure fraction, and concentration. The pure Compound 10 melts at 107–108°. It has an even better solubility in perchloroethylene than the methyl-free compounds of the formula

(11)
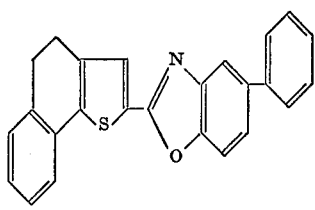

which is prepared in an analogous way and melts at 159.5–160°.

EXAMPLE 5

23 parts 4,5-dihydronaphtho-[1,2-b]-thiophen-2-carboxylic acid of melting point 210–212°, 21 parts 1-amino-2-hydroxy-5-ethylsulphonyl-benzene and 2 parts boric acid are heated in 40 parts diethylene glycol diethyl ether under a weak nitrogen current, while stirring and distilling off the liquid, at 180–190° for 60 minutes and at 200° for 20 minutes. The melt is mixed with 100 parts ethanol, starting at 120° and cooling under reflux, and then stirred on an ice bath until cold. The resultant crystalline precipitate is filtered off with suction, washed with ethanol, and dried in a vacuum at 50°. 30.3 parts of the compound of the formula

(12)
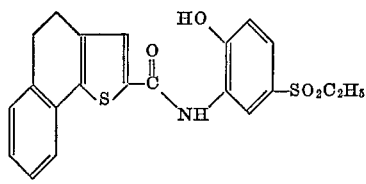

and of melting point 236–237° (from benzene) are obtained.

4 parts of the compound of the Formula 12 are heated in 20 parts phosphorus oxychloride for 15 minutes at boiling temperature while stirring and cooling under reflux; a clear yellowish solution is formed after about 5 minutes. The mixture is then cooled and poured on to 200 g. of ice while stirring. A pH value of about 3–4 is subsequently adjusted by the addition of a saturated sodium acetate solution. The resultant crystalline precipitate is filtered off with suction, washed with water and recrystallized from alcohol while still moist. 3 parts of the compound of the formula

(13)
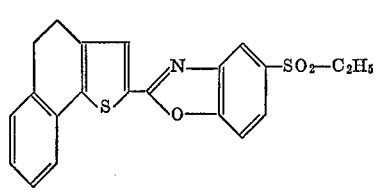

and of melting point 172–173° are obtained.

The following compounds are prepared in an analogous way with the use of the corresponding starting compounds:

(14)
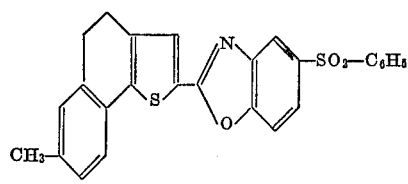

melting point: 204–205°

(15)
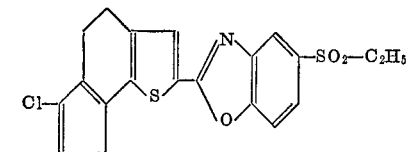

melting point: 184–185°

EXAMPLE 6

23 parts 4,5-dihydronaphtho-[1,2-b]-thiophen-2-carboxylic acid, 21.6 parts 1-amino-2-hydroxy-5-dimethyl-aminosulphonyl-benzene and 2 parts boric acid are heated in 40 parts diethylene glycol diethyl ether under a weak nitrogen current, while stirring and distilling off the liquid, at 180–190° for 30 minutes and at 200° for 15 minutes. The solidified yellow mass is cooled, heated at boiling temperature under reflux for 15 minutes with 50 parts by volume phosphorus oxychloride, and poured on to 300 parts of ice and 200 parts of water. The mixture is subsequently neutralized with a sodium hydroxide solution while cooling. The resultant crystalline precipitate is filtered off with suction, washed with water and recrystallized from 300 parts methyl glycol. For further purification, the compound is dissolved hot in 200 parts chlorobenzene, the solution clarified with 1 part tonsil and, after filtering, the product is precipitated with 300 parts methanol. 13.2 parts of the compound of the formula

(16)
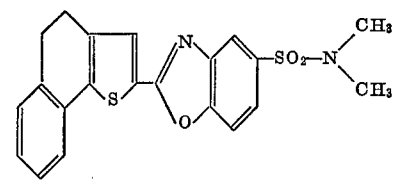

and of melting point 216–217° are obtained.

If an analogous reaction is carried out with the use of 5-methyl-4,6-dihydronaphtho-[1,2-b]-thiophen - 2 - carboxylic acid, it is expedient to increase the reaction time allowed for the treatment with boiling phosphorus oxychloride to 30 minutes. 16.4 parts of the compound of the formula

(17)
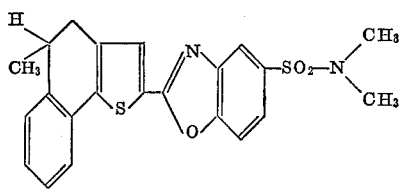

and of melting point 234–235° are obtained.

The following compound is obtained in an analogous way with the use of the corresponding starting compounds:

(18)
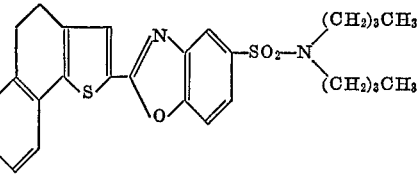

melting point: 182–183°

EXAMPLE 7

24.4 parts 5 - methyl-4,5-dihydronaphtho-[1,2-b]-thiophen-2-carboxylic acid are heated at boiling temperature under reflux for 15 minutes with 100 parts of thionyl chloride which has been distilled over linseed oil, a clear solution being formed. The excess of thionyl chloride is subsequently removed in a vacuum. The residue is taken up with 300 parts by volume of dry xylene. 17 parts 1-amino-2-hydroxybenzene-5-carboxylic acid methyl ester are added at room temperature while stirring. The mixture is heated at boiling temperature for 16 hours, while hydrogen chloride escapes. The resultant crystalline precipitate is filtered off with suction at 80°, washed with methanol, and dried at 70° in a vacuum. 22.6 parts of the compound of the formula

(19) 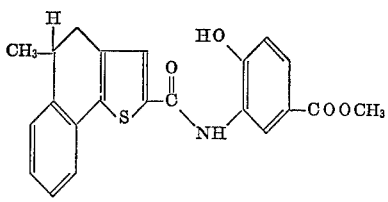

and of melting point 278–279° are obtained.

8 parts of the compound of the Formula 19 are mixed with 0.5 part boric acid and heated under nitrogen at 290–300° for one hour while water escapes. The melt is mixed with 3 parts by volume dimethyl formamide, starting at 170°, and with 35 parts by volume methanol, starting at 90° and cooling under reflux, and it is subsequently stirred on an ice bath until cold. The resultant crystalline precipitate is filtered off with suction, washed with methanol, and dried at 70° in a vacuum. 6.5 parts of a compound of the formula

(20) 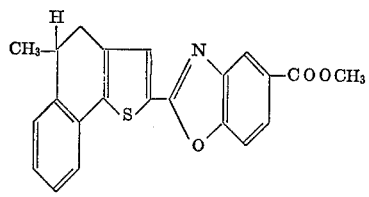

and of melting point 163–166° are obtained. After dissolving in 50 parts by volume chlorobenzene, clarification with 1 part tonsil, concentration and precipitation with methanol, the compound melts at 163–165°.

The following compounds are prepared in an analogous way with the use of the corresponding starting compounds:

(21) 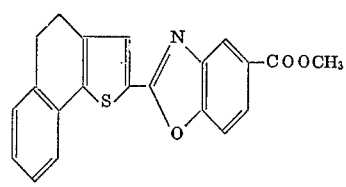

melting point: 193–195°

(22) 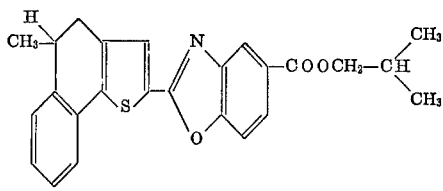

melting point: 130–133°

(23) 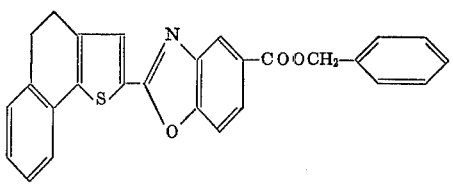

melting point: 180–181°

(24) 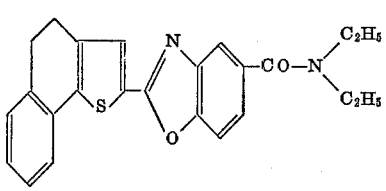

melting point: 204–206°

EXAMPLE 8

Polyester fibres produced from terephthalic acid and ethylene glycol are introduced in a liquor ratio of 1:40 into an aqueous bath containing, per litre, 1 g. sodium oleyl sulphate and 0.075 g. of the compound of the Formula 16 as brightening agent. The bath is heated to boiling temperature and kept at this temperature for 45–60 minutes. After rinsing and drying, the polyester fibres exhibit a very good brightening effect which is fast to light.

It is also possible to work with advantage in the presence of 2 g. per litre of a commercial dye carrier of the type of trichlorobenzene.

Very good brightening effects are also achieved on polyester fibres when the brightening agent mentioned above is replaced with one of the following compounds: Compound of the Formulae 1, 10, 11, 13, 14, 15, 17, 18, 20, 24.

EXAMPLE 9

Polyamide fibres of ε-caprolactam are introduced in a liquor ratio of 1:30 at 60° into an aqueous bath containing, per litre, 1 g. sodium oleyl sulphate and 0.1 g. of the compound of the Formula 10 as brightening agent. The bath is heated at 95° for 60 minutes, and the fibres are then rinsed and dried. They exhibit an excellent brightening effect. Very good brightening effects are also obtained on polyamide fibres, when the brightening agent mentioned above is replaced with one of the following compounds: Compounds of the Formulae 3, 5, 7, 8, 9, 11, 22.

EXAMPLE 10

Cellulose acetate fibres (2½-acetate) are moved about in a liquor ratio of 1:30 at 70° in an aqueous bath containing, per litre, 1 g. of a commercial interface-active paraffin sulphonate and 0.07 g. of the compound of the Formula 1 as brightening agent. The fibres are subsequently rinsed and dried. They then exhibit a very good brightening effect. Very good brightening effects are also obtained on cellulose acetate fibres when the brightening agent mentioned above is replaced with one of the following compounds: (2), (3), (4), (5), (7), (9), (10), (11), (17), (18), (22).

EXAMPLE 11

Cellulose triacetate fibres are introduced in a liquor ratio of 1:30 into an aqueous bath containing, per litre, 1 g. of a commercial interface-active paraffin sulphonate and 0.07 g. of the Compound 13 as brightening agent. The bath is then heated to 90–95° and kept at this temperature for 40 minutes. The fibres are subsequently rinsed and dried. They then exhibit a very good brightening effect. Very good brightening effects are also obtained on cellulose triacetate fibres when the brightening agent mentioned above is replaced with one of the following compounds: (6), (10), (11), (17), (18).

EXAMPLE 12

Polypropylene fibres are introduced in a liquor ratio of 1:30 into an aqueous bath containing, per litre 1 g. of a commercial interface-active paraffin sulphonate and 0.07 g. of the compound of the Formula 10 as brightening agent. The bath is heated at 95° for 30 minutes and the fibres are subsequently rinsed and dried. They exhibit a good brightening effect. Good brightening effects are also obtained on polypropylene fibres when the brightening agent mentioned above is replaced with one of the following compounds: Compound of the Formulae 1, 6, 11.

EXAMPLE 13

65 parts of a polyvinyl chloride powder prepared by emulsion polymerization, 35 parts of a commercial dioctyl phthalate as plasticizer, 2 parts of a commercial tin dilaurate as stabilizer, and 0.05 part of the compound of the Formula 6 are stirred to form a paste and subsequently rolled in a three-roll calender at 160–170° to produce a foil. The foil then exhibits an excellent brightening effect which is fast to light. Similar brightening effects are achieved when the brightening agent mentioned above is replaced with one of the following compounds: Compound of the formulae 1, 3, 10, 11.

EXAMPLE 14

100 parts of a high pressure polyethylene granulate and 0.05 part of the Compound 10 are intimately mixed in a vibration mixer and subsequently extruded in an extruder at 180–210° via a slot die to produce a foil of between 50 and 100µ thickness. The foil exhibits an excellent brightening effect. The brightening agent is completely fast to migration in polyethylene. Similar good brightening effects are achieved when the brightening agent mentioned above is replaced with one of the following compounds: Compound of the Formula 1, 6, 11.

EXAMPLE 15

100 parts of polypropylene granulate are intimately mixed in a vibration mixer with 0.05 part of the Compound 3 and 1 part titanium dioxide (rutile), and subsequently extruded in an extruder at 180–210° via a slot die to produce a foil of between 50 and 100µ thickness. The foil exhibits an excellent brightening effect. The brightening agent is completely fast to migration in polypropylene. Similar good brightening effects are achieved when the brightening agent mentioned above is replaced with one of the following compounds: Compound of the formulae 1, 5, 6, 8, 9, 10, 11, 18.

EXAMPLE 16

100 parts of polystyrene granulate are rolled on a hot roll to produce a rough sheet. 1 part titanium dioxide (rutile) and 0.1 part of the compound of the Formula 11 are then rolled in. The rolled mass is subsequently worked up in a cross-beater mill to produce a finely divided granulate. Mouldings with smooth surfaces are produced therefrom by means of an injection moulding machine. The mouldings exhibit an excellent degree of whiteness. Similar good brightening effects are achieved when the brightening agent mentioned above is replaced with one of the following compounds: Compound of the Formulae 6, 10.

EXAMPLE 17

100 parts of a fabric of poly-ε-caprolactam fibres are impregnated at room temperature with a clear padding liquor consisting of 3 parts of the compound of the Formula 10 and 997 parts of tetrachloroethylene. After squeezing to a weight increase of 64%, the fabric is dried at 80° for 1 minute and subsequently heated at 190–182° C. for 45 seconds. The fabric thus treated exhibits a very good brightening effect with good fastness properties.

EXAMPLE 18

A fabric of polyamide fibres is washed in a liquor ratio of 1:20 at 60° for 15 minutes with a washing liquor containing, per litre, 5 g. of a washing powder with which 0.2% of the brightening agent of the Formula 2 have been incorporated in the usual way in finely divided form. The washing powder has the following composition:

| | Percent |
|---|---|
| Sodium dodecylbenzene-sulphonate | 10.0 |
| Nonionic of nonyl phenol and ethylene oxide (molar ratio 1:20) | 2.5 |
| Soap flakes | 3.5 |
| Carboxy-methyl cellulose | 1.5 |
| Sodium tripolyphosphate | 45.0 |
| Sodium silicate (dry) | 5.0 |
| Sodium sulphate (10 $H_2O$) | 32.5 |

After rinsing and drying, the polyamide fabric exhibits a substantially higher degree of whiteness than before washing. By repeated washing under the stated conditions the degree of whiteness of the polyamide fabric is increased even further (up to the 5th washing).

The brightening effects achieved are outstandingly fast to light and fast to chlorine.

EXAMPLE 19

Polyacrylonitrile fibres are introduced in a liquor ratio of 1:40 into an aqueous bath containing, per litre, 1 g. of a commercial oleyl polyglycol ether, 1 g. oxalic acid, 0.5 g. of a 36% sodium bisulphite solution, and 0.075 g. of the compound of the Formula 13 as brightening agent. The bath is heated to boiling temperature within 20 minutes and kept at this temperature for 1 hour. The polyacrylonitrile fibres are subsequently rinsed and dried. They then exhibit an excellent brightening effect.

I claim:

1. A benzoxazole of the formula

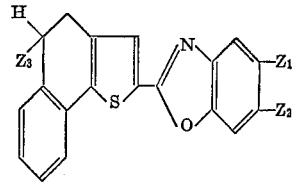

wherein $Z_1$ is hydrogen, chloro, methyl, t-butyl, cyclohexyl, benzyl, phenylisopropyl, phenyl, carboxylic acid methylester, carboxylic acid butyl ester, carboxylic acid benzylester, ethylsulfonyl, dimethylaminosulfonyl, diethylaminocarbonyl, or dibutylaminosulfonyl; and $Z_2$ and $Z_3$ are hydrogen or methyl.

2. A benzoxazole of claim 1 having the formula:

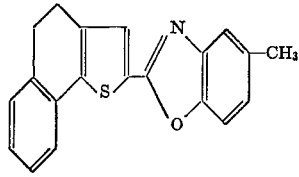

3. A benzoxazole of claim 1 having the formula:

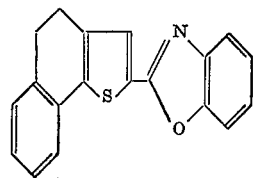

4. A benzoxazole of claim 1 having the formula:
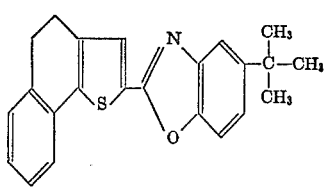
5. A benzoxazole of claim 1 having the formula:
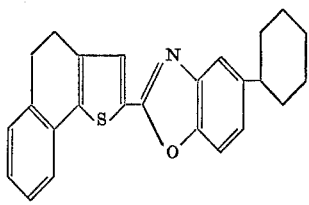
6. A benzoxazole of claim 1 having the formula:
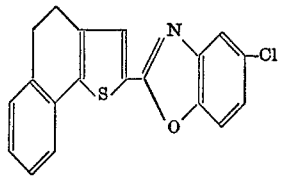
7. A benzoxazole of claim 1 having the formula:
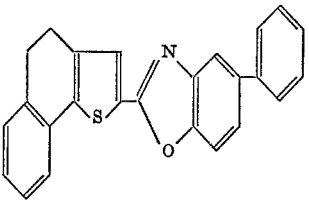
8. A benzoxazole of claim 1 having the formula:
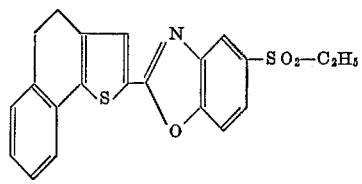
References Cited
UNITED STATES PATENTS
| | | | |
|---|---|---|---|
| 3,255,199 | 6/1966 | Maeder et al. | 260—307 |
| 3,452,036 | 6/1969 | Crocker et al. | 260—307 |
| 3,557,121 | 1/1971 | Faith | 260—281 |
| 3,565,890 | 2/1971 | Tanaka | 260—240 |
ALEX MAZEL, Primary Examiner
R. V. RUSH, Assistant Examiner
U.S. Cl. X.R.
252—301.2 W